United States Patent
Karniely

(10) Patent No.: US 9,325,512 B2
(45) Date of Patent: *Apr. 26, 2016

(54) VIRTUAL PRIVATE MEETING ROOM

(71) Applicant: INTERWISE LTD., Ben Gurion Airport (IL)

(72) Inventor: Haim Karniely, Holon, IL (US)

(73) Assignee: INTERWISE LTD., Ben-Gurion Airport (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/566,004

(22) Filed: Dec. 10, 2014

(65) Prior Publication Data

US 2015/0163069 A1 Jun. 11, 2015

Related U.S. Application Data

(63) Continuation of application No. 14/230,259, filed on Mar. 31, 2014, now Pat. No. 8,943,139, which is a continuation of application No. 13/763,965, filed on Feb. 11, 2013, now Pat. No. 8,732,244, which is a continuation of application No. 13/466,209, filed on May 8, 2012, now Pat. No. 8,402,091, which is a continuation of application No. 11/787,562, filed on Apr. 16, 2007, now Pat. No. 8,200,756.

(51) Int. Cl.
| | |
|---|---|
| *G06F 15/16* | (2006.01) |
| *H04L 12/18* | (2006.01) |
| *H04M 3/56* | (2006.01) |
| *H04M 7/00* | (2006.01) |
| *H04L 29/06* | (2006.01) |
| *H04L 12/911* | (2013.01) |

(52) U.S. Cl.
CPC .......... *H04L 12/1822* (2013.01); *H04L 47/783* (2013.01); *H04L 65/403* (2013.01); *H04M 3/562* (2013.01); *H04M 3/567* (2013.01); *H04M 7/006* (2013.01)

(58) Field of Classification Search
CPC ...................................................... H04L 29/06
USPC .................................................. 709/205, 204
See application file for complete search history.

(56) References Cited

U.S. PATENT DOCUMENTS

| | | | |
|---|---|---|---|
| 5,471,318 A | * | 11/1995 | Ahuja et al. .................. 358/400 |
| 5,704,042 A | | 12/1997 | Hester et al. |
| 5,784,561 A | | 7/1998 | Bruno et al. |
| 5,872,923 A | | 2/1999 | Schwartz et al. |
| 5,996,002 A | | 11/1999 | Katsurabayashi et al. |
| 6,119,147 A | | 9/2000 | Toomey et al. |
| 7,688,966 B2 | | 3/2010 | Kumar et al. |

(Continued)

*Primary Examiner* — David Lazaro
*Assistant Examiner* — Marie Georges Henry
(74) *Attorney, Agent, or Firm* — Guntin & Gust, PLC; Ralph Trementozzi

(57) ABSTRACT

A conference session is established. Different unique identifications and persistent dedicated virtual private network conference rooms are assigned to different recipients. A conference session using one of the persistent dedicated virtual private network conference rooms assigned to a recipient is established using a communication device with a processor and memory and in response to an instruction from the recipient assigned the persistent dedicated virtual private network conference room. A network resource is allocated to the conference session established, based on a participant in the conference session logging in to the conference session using one of the unique identifications.

20 Claims, 2 Drawing Sheets

(56) References Cited

U.S. PATENT DOCUMENTS

| | | |
|---|---|---|
| 7,983,406 B2 | 7/2011 | Diethorn |
| 8,289,949 B2 | 10/2012 | Hiie et al. |
| 2003/0014488 A1* | 1/2003 | Dalal et al. .................... 709/204 |
| 2003/0037109 A1 | 2/2003 | Newman et al. |
| 2005/0058088 A1* | 3/2005 | Decker et al. ................ 370/260 |
| 2006/0041617 A1 | 2/2006 | Ludwig et al. |

\* cited by examiner

VIRTUAL PRIVATE MEETING ROOM

The present application is a continuation of pending U.S. patent application Ser. No. 14/230,259, filed on Mar. 31, 2014, which is a continuation of U.S. patent application Ser. No. 13/763,965, filed on Feb. 11, 2013, now U.S. Pat. No. 8,732,244, which is a continuation of U.S. patent application Ser. No. 13/466,209, filed on May 8, 2012, now U.S. Pat. No. 8,402,091, which is a continuation of U.S. patent application Ser. No. 11/787,562, filed on Apr. 16, 2007, now U.S. Pat. No. 8,200,756, the disclosures of which are incorporated herein by their entireties.

FIELD OF THE INVENTION

The present invention relates to phone conferencing, multimedia conferencing, online conferencing, collaboration software, real-time collaboration applications, and more specifically to a virtual private meeting room.

BACKGROUND OF THE INVENTION

A need often arises for people to meet and share information, exchange data or documents, discuss topics, or collaborate in preparing various documents. It may not be desirable, or possible, for all of the participants in a meeting to be in the same physical location at the same time, in which case meeting objectives may be achieved using communication equipment or networks, and tools such as software tools for facilitating remote collaboration in a multimedia collaboration session.

It can be useful for such a session to include a variety of media types that include the participants' voices, video images, shared documents, text messages, drawings, computer screen images, etc.

Several systems exist for teleconferencing or telecollaboration; in several such systems session information disappears a certain time after the session ends. For instance, a meeting participant that wants to see material presented during a previous session may not be able to find it several weeks after the session ended.

Some systems require a conference ID for each sessions, and some require a distinct Conference ID and or user ID for sessions conducted using different types of media, for example if a user connects to a session via a telephone and via a computer. Some systems don't allow a user to be connected simultaneously from several devices, for instance both from a telephone and from a computer. In many systems the audio portion is managed on phones in a phone conference in parallel to a data collaboration session on a different system—in this case each of the sessions has a different conference ID or entry code.

Another drawback of some prior art systems is that they allocate resources in advance and not only when a session actually starts. For instance some systems allocate telephony ports in advance, sometimes a long time ahead. If the session does not start as planed the allocated resources are released.

Therefore, it would be beneficial to provide improved systems and methods for collaboration, which for example can overcome the illustrative drawbacks of existing collaboration tools mentioned or provide new functionality to users.

SUMMARY OF THE INVENTION

An aspect of an embodiment of the invention, relates to a system and method for conducting multi-user conferences, wherein each user can participate in the conference with multiple devices (e.g. telephones and computers) and multiple types of communication, for example audio, video, text. In an exemplary embodiment of the invention, each user is provided with a unique ID to identify the user when connecting via any available device and/or by any method of communication and associate all of the user's devices to the same meeting. A user that can initiate a conference is associated with a virtual private meeting room, which defines a virtual meeting place for multiple users to connect to and participate in a meeting when the virtual meeting room is activated. Optionally, the proceedings of the meeting are recorded and stored in a database associated with the virtual meeting room for future access by the participants of the meeting. Optionally, the proceedings include among other things the list of participants in the meeting, the time each participant joined the meeting, a voice recording of the conversation in the meeting, a recording of any data transferred during the meeting, for example videos, files, text, and pictures.

In an exemplary embodiment of the invention, the data recorded from the proceedings of a conference is persistent and remains available after the conference is over. In some embodiments of the invention, the meeting room owner may edit the recorded data. Alternatively, the recorded data may not be edited but can be deleted by the meeting room owner.

In an exemplary embodiment of the invention, when a user contacts a server with one or more devices, each device may be identified to the server by the unique user ID so that the server can join the device to a common conference. In some embodiments of the invention, a conference initiator schedules a conference by defining a virtual meeting room for conducting the conference, a time for the conference and a list of user's, which are identified by their user IDs that may participate in the conference.

In some embodiments of the invention, the user dynamically activates his meeting room, by accessing it and providing his credentials.

There is thus provided in accordance with an exemplary embodiment of the invention a method of providing a multimedia conference meeting, the method comprising:
  (a) providing each of a plurality of users with a unique user id;
  (b) associating with each user, that is permitted to initiate a conference meeting, a persistent virtual private meeting room;
  (c) establishing a conference session, in response to an activation act by a meeting initiator, said session is associated with the meeting initiator's persistent virtual private meeting room;
  (d) when a session is active, establishing communications via a plurality of network connections and/or phone connections between users that are logged in/dialed in to the conferencing session.

In some embodiments of the invention, the user is a meeting initiator; said session is associated with the meeting initiator's virtual private meeting room.

In some embodiments of the invention, a unique user id is a unique number or unique string or a combination thereof; a unique user id is a unique telephone number or a unique email address or a combination thereof; or the user is allocated more than one user id.

In some embodiments of the invention, communication is established between the user's client software and at least one server that enable collaboration among the users of a conference session.

In some embodiments of the invention, the user can be connected to a conference session simultaneously from a plurality of devices.

In some embodiments of the invention, the user has the same unique user id for connecting from different devices.

In some other embodiments of the invention, the user selects the type of content to receive on a particular device.

In yet other embodiments of the invention, the user can be connected to a session, simultaneously from a remote computer and from a phone or from a handheld or wireless device having telephony capabilities.

In some embodiments of the invention, the user has the same unique user id for connecting to a session from a phone and from a computer.

In other embodiments of the invention, the user connects to different conference sessions using the same unique user id.

In some embodiments of the invention, the virtual private meeting room owned by the meeting initiator of a conference session stores log information of the session or by the user initiating a conference session, stores content provided or presented during the session or by the user initiating a conference session, stores content provided or presented during sessions initiated by said user.

In some embodiments of the invention, the content includes any combination of text files, text messages, slides, multi-media files, shared documents, video clips, music, participants' voices and drawings.

In some embodiments of the invention, communication is established when the conference session is active and wherein establishing communication comprises dynamic allocation and release of resources.

In other embodiments of the invention, allocation of resources occurs when the user joins an active session; release of resources occurs when a user leaves an active session; allocation or release of resources is based on at least one optimization criteria; and allocation or release of telephony ports is carried out when a phone connects to a when a session that is active.

There is also provided in accordance with an exemplary embodiment of the invention a computer-readable medium having computer-executable set of instructions for performing steps for providing a multi-media conference meeting, the set of instructions comprising (a) providing each of a plurality of users with a unique user id; (b) associating with each unique user id a virtual private meeting room; (c) establishing a conference session, in response to an activation act by the user that is a meeting initiator, said session is associated with the meeting initiator's persistent virtual private meeting room; and (d) after establishing a conference session, establishing communications via a plurality of network connections between users that are logged in to the conferencing session.

There is also provided in accordance with an exemplary embodiment of the invention a system for providing a conferencing or collaboration session, comprising a) at least one management and control software; b) at least one computer server c) at least one storage device d) at least one persistent database e) a plurality of communication devices; the system (a) providing each of a plurality of users with a unique user id; (b) associating with each user id a virtual private meeting room; (c) establishing a conference session, in response to an activation act by a user that is a meeting initiator, said session is associated with the meeting initiator's persistent virtual private meeting room; and (d) after establishing a conference session, establishing communications via a plurality of network connections between users that are logged in to the conferencing session.

In the above exemplary embodiments of the present invention the virtual private meeting room is preferably persistent and resources for the conference session are dynamically allocated.

BRIEF DESCRIPTION OF THE FIGURES

The present invention will be understood and better appreciated from the following detailed description taken in conjunction with the drawings. Identical structures, elements or parts, which appear in more than one figure, are generally labeled with the same or similar number in all the figures in which they appear, wherein.

DETAILED DESCRIPTION OF EXEMPLARY EMBODIMENTS

The invention generally relates to a system, methods, and software for providing multi-media conferencing or collaboration.

For clarity of the description, a non-limiting example of a multi-media conferencing service system is described as an exemplary embodiment of the invention.

Figure 1:
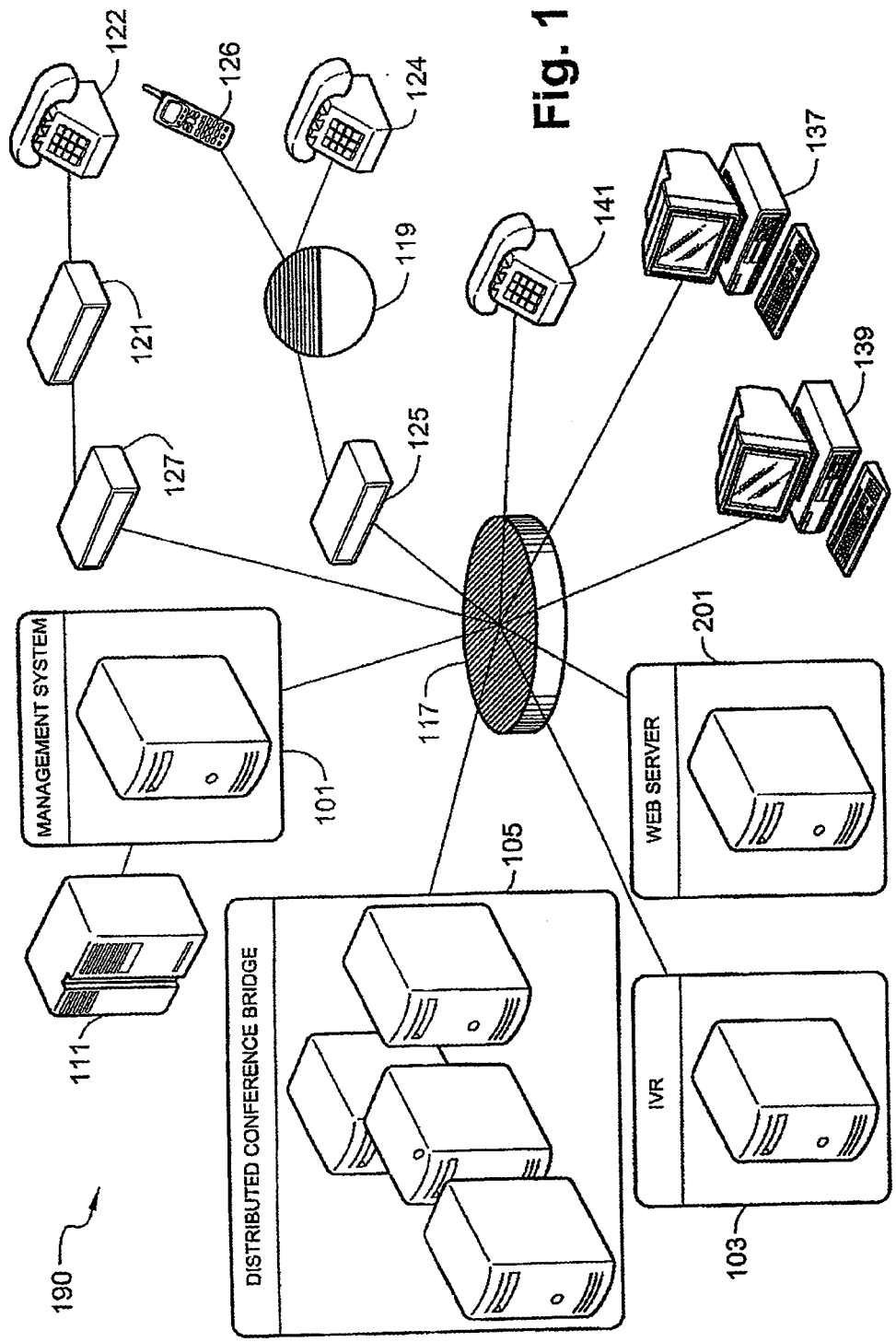
FIG. 1 is a schematic illustration of a conferencing system providing multi-media conferencing services, in accordance with an exemplary embodiment of the invention.

FIG. 1 is a schematic illustration of a conferencing system 190 providing multi-media conferencing services. Various elements shown in FIG. 1 cooperate to provide communication services among users, including telephony, multi-party conferencing and collaborative communications. By way of example, conferencing services are supported by a service provider, which supplies a conferencing management application 101 that operates with an interactive voice response (IVR) system 103 and an Distributed Internet Protocol (IP) conference bridge 105 which is comprised of multiple distributed servers as described in detail in U.S. patent application Ser. No. 11/509,253 titled A SOFTWARE BRIDGE FOR MULTI-MEDIA TELECONFERENCING AND TELE-COLLABORATION, filed 24 Aug. 2006, the contents of which is incorporated herein by reference. Optionally, IVR system 103 controls directing of telephone connections into conferences. Likewise, Web Server 201 directs PC client connections into conferences. All aspects of each of the conferences are managed by a distributed IP conference bridge 105. Thus, a conference based upon elements, which use all the devices will be managed by system 190 as a single session.

In an exemplary embodiment of the invention, conference management application 101 processes requests to schedule a conference for a certain date and time as well as ad hoc activation of conferences by users accessing their own meeting rooms. Conference management application 101 allows logging of events pertaining to a conference session and recording of the control of the session as well as the content of the session. Optionally, session control includes logging of events, such as for example, start time, stop time, logon and logoff times of each participant, along with indexing markers or annotations inserted during the session by a presenter or participants. In an exemplary embodiment of the invention, the recording process, includes recording video, audio, textual messaging conversations, presentations and collaborative work as well as data items, such as documents or images, which are introduced by participants in the course of the meeting.

The conference management application 101 controls a database 111, wherein session information and data is preferably stored. Database 111 may be replaced by a number of different databases interconnected and located in various locations and managed by conference management application 101. Additionally, conference management application 101 performs various management functions for controlling conferencing services, such as identifying the participants of the conference, authenticating participants that attempt to access or activate conferences and redirecting of participates to dynamically allocated resources in conference bridge 105.

A communications network 117 provides communications among the processes and sub-systems of the network service provider. Network 117 can include multiple interconnected networks, with connectivity, for example, to the Internet or other public data networks. The network 117, in an exemplary embodiment, is a data transport network, such as an Internet Protocol (IP) based network, an Asynchronous Transfer Mode (ATM) network, a frame relay network, or a combination thereof. The network 117 interfaces with telephony systems, such as a Public Switched Telephone Network (PSTN) 119 and a Private Branch Exchange (PBX) 121, via an IP gateway 125 or 127.

The gateway 125 provides an interface between the network 117 and the PSTN 119. The gateway 125 allows a party using a conventional phone such as telephone 124 or a wireless phone 126 to dial into the distributed IP Conference bridge 105. IP Phones such as SIP Phone 141 can connect to the IP conferencing system directly through the IP network without an IP Gateway. It is noted that the SIP phone 141 can be implemented as a stand-alone device or as a software client, for example on a personal computer.

Similarly, the gateway 127 couples the network 117 to a private branch exchange (PBX) 121, which supports one or more PBX telephones 122. In this example, the PBX 121 resides at the user's site. The PBX 121 is often of proprietary design and function, but presents a standard signaling and trunk interface in order to be connected to conventional telephone networks. Gateway 127 enables telephone 122 to participate in conferences through the network 117.

In an exemplary embodiment of the invention, personal computers 137, 139 and voice over IP phones (e.g. SIP phone 141) are connected to network 117. Optionally, personal computers 137, 139 may require the use of a software client (not shown) to enable the transfer of data from the client stations to system 190.

In an exemplary embodiment of the invention each of a plurality of users is provided by system 190 with a unique user ID. Optionally the user ID is provided by management application 101. The unique user ID is a unique number or a unique string or a combination thereof. The unique user ID can be a unique telephone number or a unique email address or a combination thereof. The unique user ID serves the user to connect from multiple devices to a conference session, for instance from telephone 122 and from computer 137 and be recognized as a single user controlling multiple devices in a concurrent session. Optionally these connections are established simultaneously, although some devices may be used simultaneously and some may be used sequentially as the need arises during the conversation. The unique user ID also serves the user for connecting to different sessions that occur at different times. In some exemplary embodiments of the present invention, the need to recognize a user using more than a single device arises when users would use one device to transfer audio signal from and to the conference and another device to transfer data from and to the conference. Such exemplary situation arises when a user does not have a microphone connected to his computer, for example, or when the user's computer lacks a sound card, or if the user's computer is connected to a low band connection which will not effectively convey both data and voice information from and to the conference.

In some embodiments of the invention, a user is allocated more than one user ID, for example one to identify the user as he/she logs onto system 190 and a second user ID to identify a meeting room for the user (as described below). Optionally, one user ID may be a function of the other, for example the second user ID may be the first unique user ID with an additional number appended to it or removed from it. The unique user ID is used for example to allow the user to log in to schedule events or respond to invitations to schedule events, or to allow system 190 to link between conversations conducted by the user with more than one device (e.g. PC and telephone). In contrast the meeting room ID may be given by the user to others in order to allow them to enter his meeting room to conduct meetings.

In some embodiments of the invention, the unique ID comprises a unique number or a string of characters which is allocated by system 190 or selected by the user and verified for uniqueness by system 190. Its some embodiments of the invention, the unique user ID may be a telephone number or an email of the user.

In an exemplary embodiment of the invention, a virtual private meeting room is associated with each unique user id. All information associated with a conference session or meeting, such as information presented during the meeting, is associated with the virtual private meeting room of the meeting initiator. Optionally, the information comprises the session log information of the participants, content provided or presented during the session, wherein content includes any combination of text files, text messages, slides, multi-media files, shared documents, video clips, music, participants' voices and drawings.

In an exemplary embodiment of the invention, the information associated with the virtual private meeting room is saved in database 111 and is stored indefinitely. Therefore, the virtual private meeting room is considered persistent, since information associated with previous conference sessions can be accessed at any time in the future after a conference was conducted. To maintain persistency of the conference files and data, each conference file or data is associated with a User ID and is stored such that each such user whose ID is associated with said file or data may later access or retrieve the files and data associated with his ID. Data stored in the database 111 can include data associated with each conference, such as the names of the participants, the location of each participants, information about each participant, the time the conference begun and ended, the materials used, the messages exchanged, the documents sent to participants, notes made by any of the participants, a recording of the conference, meta data associated with the conference to include statistical data, data associated with a number of conferences, for example a series of interrelated conferences, meta data associated with a number of conferences, including statistical data, usage times, talk times, the number of documents exchanged, the bandwidth taken and the like.

In an exemplary embodiment of the invention a user initiates a conference meeting by accessing management application 101. Accessing can be from a client software, for instance from a web browser (e.g. accessing a web page that is designed to let the user schedule a meeting) or from Microsoft outlook (e.g. using the calendar to schedule meetings) or from a specially designed client software. The process of initiating a meeting comprises providing a meeting name or meeting subject, providing a date and time and duration of the meeting, providing a list of participants, wherein each participant is identified by a unique user ID, and optionally providing additional information. Alternatively a user can activate a meeting in an "Ad hoc" manner by connecting to system 190, provide his meeting room ID, and initiator password. Once the user has "opened" his/her meeting room other users can be notified to join the conference session.

In an exemplary embodiment of the invention, a user can join a conference by logging into system 190 and requesting to enter a specific meeting room, or system 190 may be set to automatically "pull" the user into concurrent conferences which requested his/her participation as soon as they login.

Figure 2:
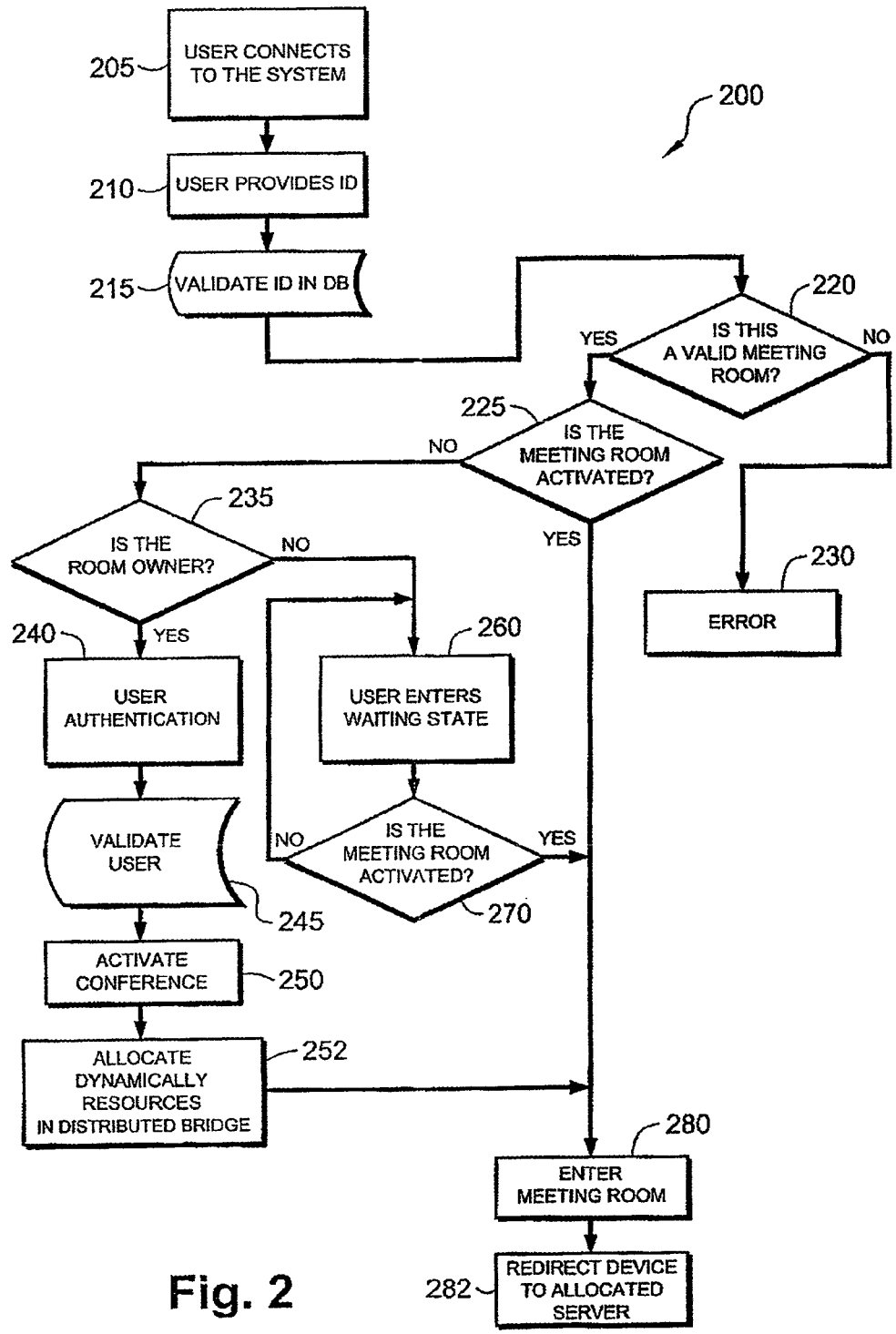
FIG. 2 is a flow chart of a process for providing or participating in a conference session, in accordance with an exemplary embodiment of the invention.

FIG. 2 is a flowchart 200 of a process for providing or participating in a conference session, in accordance with an exemplary embodiment of the invention. In an exemplary embodiment of the invention, a user connects (205) to system 190 with a PC (e.g. personal computer 137) or a telephone (e.g. telephone 122, 124) or any other communication device. Optionally, the user may provide a meeting room ID of the conference in which the user is interested to participate (210) and the ID is preferably validated (215). Optionally, system 190 determines (220) if the meeting room for accommodating the conference is a valid meeting room that was defined in system 190. If the meeting room ID is not valid system 190 will indicate that an error (230) has occurred and deny service or allow the user to reenter the meeting room D. If the meeting room ID is a valid ID, system 190 determines if the meeting room is activated (225) to allow users to enter and participate in a conference. If the meeting room has been activated for a conference the user enters (280) the meeting room and joins the conference, wherein the user may participate by viewing the conference material and contribute to the conference. However if the meeting room is not activated system 190 determines (235) if the user is the owner of the meeting room and can then initiate a conference. If the user is not the owner of the meeting room the user will enter (260) into a waiting state, wherein system 190 will periodically query (270) the status of the meeting room and if it becomes available allow the user to enter (280). When the user enters the meeting room his device (PC or phone or other communication device) is automatically redirected to an allocated server in the distributed IP conference bridge (282). In case of phone the phone is redirected from the IVR to the distributed conference bridge, and in the case of a PC client application the client application receives a list of available server and establishes an IP connected to the one of the servers. The system may also dynamically allocated additional conference servers to serve this conference in case resources on one of the servers participating in this conference are exhausted.

If the user is the owner of the meeting room the user will be authenticated by providing (240) the owner password, which will be validated (245) in database 111 by system 190. Other known or later developed authentication methods can also be applied by those skilled in the art. Optionally, after verifying that the user is the owner of the meeting room, system 190 will activate (250) a conference using the meeting room. In this phase Management system 101 dynamically allocates resources on one or more servers in the distributed conference bridge 105 to the conference (252) and the user enters the meeting room (280) as is described above.

In an exemplary embodiment of the invention, once a user has activated a meeting room, the user may provide IDs of users or groups of users that are allowed to join the conference or open the conference to any user that is interested in joining. In some embodiments of the invention, the list of users that are allowed to participate in the conference is provided when scheduling the conference.

In some embodiments of the invention, users cannot enter the meeting room if the meeting room owner is not logged in. Alternatively, users that were invited to a scheduled conference may enter the meeting room and begin the conference even without participation of the owner of the meeting room.

In some embodiments of the invention, if the owner logs out the meeting room is closed down and any active conference is ended. Optionally, users that participated in the conference may have access to the records that were created by the conference and stored on database 111.

In some embodiments of the invention, the owner of the meeting room is the first presenter and the other participants are not provided with privileges allowing such participants to change documents or upload documents or make notations on a shared document. In other alternative embodiments of the present invention each user, whether owner of the meeting room or not is provided with privileges with respect to presenting, changing or editing documents, making notations and the like. Such privileges can be provided prior to the conference based on predetermined user preferences or owner preferences.

In some embodiments, the system and methods of the invention provide a client-server infrastructure capable of supporting multimedia conferencing activities in a virtual private meeting room. The client-server infrastructure supports data persistence, so that data files associated with the virtual private room can be stored for subsequent access.

In a preferred embodiment of the present invention, the meeting room resources are allocated by the system 190 only once the conference session is activated. The resources will be typically dynamically allocated such that available resources such as hard disk space, band width, processor time and like resources are provided to the activated meeting room according to the number of participants which joined effectively. Thus, even if a conference is scheduled for hundreds of users and only a handful or users eventually join the conference, such conference (event) resources are limited to the number of participants that actually joined. In practice, once a participant joins the conference the system 190 will review its available resources and allocate additional resources which are necessary to maintain an efficient conference. System 190 is provided with predetermined definitions of which resources are required to obtain a the level of service expected from the conference, such as what is the amount disk space, band width, processor time necessary, and the like. Optimization criteria may be used to enhance the quality of service provided during the event. Such can include the expected bandwidth available to each participant, the quality of video or audio provided to each participant, the distance between each of the servers and each of the participants, the location where conference materials are stored, the availability of storage for each participant, and the like. For better quality of service additional resources will be required, though these are allocated, as noted above, on the basis of participants effectively joining the conference. The resources may also be allocated and released based on the optimization criteria. Thus, in one exemplary embodiment of the invention, if to provide better video or audio quality additional resources are to be allocated, and if such resources are available, such resources will be allocated when a particular participant joins or is of need of such resources.

In some embodiments of the present invention resource allocated to an event are releases back to system 190 when a user leaves an active session. Such resources may be reallocated to other on going events.

In some embodiments of the present invention telephone ports are allocated to an event only when a telephone connects to a session, if such session is active. Such allocation is efficient since persons wishing to connect to an event will not be allocated a port until such time when the even is active and the participants can begin the conference. Until such time, the waiting participants are put on hold thus releasing some of the telephony ports for the use of other participants in other on going "live" events.

The present invention has been described using non-limiting detailed descriptions of embodiments thereof that are provided by way of example and are not intended to limit the scope of the invention. It should be understood that features described with respect to one embodiment may be used with other embodiments and that not all embodiments of the invention have all of the features shown in a particular figure or described with respect to one of the embodiments. It is noted that some of the above described embodiments may describe the best mode contemplated by the inventors and therefore include structure, acts or details of structures and acts that may not be essential to the invention and which are described as examples.

While the above description has focused on methods, it is meant to also encompass apparatus for carrying out the invention. The apparatus may be a system comprising of hardware and software. The apparatus may be a system, such as, programmed computers or a network appliance. The apparatus may include various computer readable media having suitable software thereon, for example, diskettes and computer and/or flash RAM.

Structure and acts described herein are replaceable by equivalents, which perform the same function, even if the structure or acts are different, as known in the art. Therefore, only the elements and limitations as used in the claims limit the scope of the invention. When used in the following claims, the terms "comprise", "include", "have" and their conjugates mean "including but not limited to".

What is claimed:

1. A method of establishing a conference session, comprising:
    assigning different unique identifications and persistent dedicated virtual private network conference rooms to different recipients;
    establishing, using a communication device with a processor and memory and in response to an instruction from a recipient assigned a persistent dedicated virtual private network conference room of the persistent dedicated virtual private network conference rooms and acting as a host, a conference session using the persistent dedicated virtual private network conference room assigned to the recipient;
    dynamically allocating a network resource to the conference session established, based on a participant in the conference session logging in to the conference session using one of the unique identifications; and
    releasing the network resource allocated when the participant logs out of the conference session.

2. The method of claim 1,
    wherein the network resource comprises memory.

3. The method of claim 2, further comprising:
    dynamically allocating bandwidth to the conference session established, based on a participant in the conference session logging in to the conference session.

4. The method of claim 3, further comprising:
    dynamically allocating processor capacity to the conference session established, based on a participant in the conference session logging in to the conference session.

5. The method of claim 4, further comprising:
    dynamically allocating a communication port to the conference session established, based on a participant in the conference session logging in to the conference session.

6. The method of claim 1,
    wherein the network resource comprises bandwidth.

7. The method of claim 6, further comprising:
    dynamically allocating processor capacity to the conference session established, based on a participant in the conference session logging in to the conference session.

8. The method of claim 7, further comprising:
    dynamically allocating a communication port to the conference session established, based on a participant in the conference session logging in to the conference session.

9. The method of claim 1,
    wherein the network resource comprises processor capacity.

10. The method of claim 9, further comprising:
    dynamically allocating a communication port to the conference session established, based on a participant in the conference session logging in to the conference session.

11. The method of claim 1,
    wherein the network resource comprises a communication port.

12. The method of claim 1, further comprising:
    dynamically releasing the network resource allocated based on a participant logging out of the conference session.

13. The method of claim 12, further comprising:
    reallocating a network resource released from a first conference session, based on a first participant logging out of the first conference session, to a second conference session, based on a second participant logging in to the second conference session.

14. The method of claim 1,
    wherein the network resource is dynamically allocated based on a number of participants that join the conference session.

15. The method of claim 1,
    wherein the network resource is provided from a server.

16. The method of claim 1,
    wherein material presented during the conference session remains available, to a participant that logged in to the conference session, in association with the dedicated virtual private network conference room after an end of the conference session.

17. The method of claim 1,
    wherein a unique identification is shared among each of a plurality of distinct devices concurrently connected to a participant in a conference session.

18. The method of claim 1,
    wherein a unique identification is used to connect a recipient to different conference sessions at different times.

19. A non-transitory computer readable medium that stores a set of executable instructions for establishing a conference session, the executable instructions, when executed by a processor, causing a computer to perform operations comprising:
    assigning different unique identifications and persistent dedicated virtual private network conference rooms to different recipients;
    establishing, using a communication device with a processor and memory and in response to an instruction from a recipient assigned a persistent dedicated virtual private network conference room of the persistent dedicated virtual private network conference rooms and acting as a host, a conference session using the persistent dedicated virtual private network conference room assigned to the recipient;

dynamically allocating a network resource to the conference session established, based on a participant in the conference session logging in to the conference session using one of the unique identifications; and releasing the network resource allocated when the participant logs out of the conference session.

20. A computer that executes executable instructions for establishing a conference session, the computer comprising:

memory that stores the executable instructions; and a processor, wherein the processor executes the executable instructions, and the executable instructions, when executed, cause the computer to perform operations comprising:

assigning different unique identifications and persistent dedicated virtual private network conference rooms to different recipients;

establishing, using a communication device with a processor and memory and in response to an instruction from a recipient assigned a persistent dedicated virtual private network conference room of the persistent dedicated virtual private network conference rooms and acting as a host, a conference session using the persistent dedicated virtual private network conference room assigned to the recipient;

dynamically allocating a network resource to the conference session established, based on a participant in the conference session logging in to the conference session using one of the unique identifications; and releasing the network resource allocated when the participant logs out of the conference session.

\* \* \* \* \*